US006775651B1

(12) United States Patent
Lewis et al.

(10) Patent No.: US 6,775,651 B1
(45) Date of Patent: Aug. 10, 2004

(54) METHOD OF TRANSCRIBING TEXT FROM COMPUTER VOICE MAIL

(75) Inventors: James R. Lewis, Delray Beach, FL (US); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/579,985

(22) Filed: May 26, 2000

(51) Int. Cl.[7] .................................................. G10L 15/26
(52) U.S. Cl. .................. 704/235; 704/260; 379/88.01; 379/88.22; 379/93.24
(58) Field of Search ................................ 704/235, 260, 704/270, 201, 231, 211, 246, 270.1, 278, 275; 379/88.01, 88.02, 88.04, 88.22, 88.13, 88.14, 93.24, 88.23, 100.08, 67.1, 80, 80.24, 93.03

(56) References Cited

U.S. PATENT DOCUMENTS

| | | | | |
|---|---|---|---|---|
| 5,199,062 A | * | 3/1993 | Von Meister et al. | 379/88.04 |
| 5,526,407 A | * | 6/1996 | Russell et al. | 379/88.01 |
| 5,568,540 A | * | 10/1996 | Greco et al. | 379/88.25 |
| 5,615,296 A | * | 3/1997 | Stanford et al. | 704/270.1 |
| 5,696,879 A | * | 12/1997 | Cline et al. | 704/260 |
| 5,771,276 A | * | 6/1998 | Wolf | 379/88.16 |
| 5,822,405 A | * | 10/1998 | Astarabadi | 379/88.04 |
| 6,014,428 A | * | 1/2000 | Wolf | 379/88.11 |
| 6,067,516 A | | 5/2000 | Levay et al. | |
| 6,167,376 A | * | 12/2000 | Ditzik | 704/235 |
| 6,216,104 B1 | * | 4/2001 | Moshfeghi et al. | 704/260 |
| 6,219,407 B1 | * | 4/2001 | Kanevsky et al. | 379/88.02 |
| 6,327,343 B1 | * | 12/2001 | Epstein et al. | 379/88.01 |
| 6,366,882 B1 | * | 4/2002 | Bijl et al. | 704/235 |
| 6,401,063 B1 | * | 6/2002 | Hebert et al. | 704/234 |
| 6,415,256 B1 | * | 7/2002 | Ditzik | 704/231 |
| 6,442,242 B1 | * | 8/2002 | McAllister et al. | 379/67.1 |

FOREIGN PATENT DOCUMENTS

| GB | WO89/10612 A1 | 11/1989 | ............. G10L/5/06 |
|---|---|---|---|
| GB | 2323694 | 9/1998 | |

* cited by examiner

Primary Examiner—Vijay Chawan
(74) Attorney, Agent, or Firm—Akerman Senterfitt (57) ABSTRACT

The invention concerns a method and a system for transcribing a voice mail message. The method of the invention involves a plurality of steps including, first providing a computer voice mail message stored in an audio file to a computer speech recognition system and, second, submitting the computer voice mail message to a speaker identification process in the speech recognition system. Notably, the speaker identification process can identify an enrolled speaker as a source of the computer voice mail message. Finally, responsive to the identification of the enrolled speaker, the computer voice mail message can be submitted to a speech conversion process in the speech recognition system. The speech conversion process can perform speech-to-text conversion of the computer voice mail message using speaker enrollment data corresponding to the identified enrolled speaker. Furthermore, the speech-to-text conversion can produce a transcription of the computer voice mail message. In one embodiment of the present invention, the transcription further can be displayed.

21 Claims, 3 Drawing Sheets

METHOD OF TRANSCRIBING TEXT FROM COMPUTER VOICE MAIL

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition software, and more particularly, to a system for transcribing telephone answering machine voice mail messages.

2. Description of the Related Art

An ever growing number of people have begun using personal computers as a source of voice mail services. By alleviating the need and expense of a separate telephone answering machine, the use of a personal computer to record voice mail messages over a telephone line allows consumers to save money. This trend is likely to continue due to the impressive amount of computing power presently available to consumers in affordable multimedia personal computers. Moreover, the components enabling personal computers to provide voice mail services, such as sound cards and modems, have become standard equipment on most high-speed multimedia personal computers.

Beyond the savings afforded to consumers, computer voice mail systems provide consumers with increased flexibility over their telephone answering machine counterparts. The increasing speed and storage capacity of personal computers enables these machines to record longer messages and store far more messages than conventional telephone answering machines. Moreover, voice mail messages left by callers can be recorded in any of a variety of standardized multimedia or audio file types such as Wave or MP3 files. Such digital files can be manipulated, copied, stored, or transmitted.

Despite the many advantages of using a personal computer for voice mail, however, there exist disadvantages. One such disadvantage is that although the storage capacity of modern personal computers may seem limitless, audio files themselves can be quite large. Thus, storing or archiving old voice mail messages may consume far more storage capacity than what is available in any particular personal computer. In a network context, where storage capacity is often obtained at a premium, the large size of voice mail audio files can become even more problematic.

Another disadvantage inherent to computer based voice mail systems is that the large size of audio files can hinder rapid transmission of the files over networks and can cause network congestion. Such congestion often results in decreased network performance or even a network service outage. Further contributing to the problem is that compression of a Wave or MP3 file typically does not result in a substantial enough reduction of the file size. Thus, a detailed voice mail message of three to four minutes in length, saved as a Wave or MP3 file, can take much longer than the three or four minute playing time to upload and transmit the audio file via a conventional 28.8 kpbs modem connection.

Another disadvantage, inherent to all voice mail systems, is that undoubtedly an occasion will arise in which the user would find a textual transcription of the voice mail message convenient. Such is the case when a voice mail contains directions to a location. Whether the voice mail message containing the directions is left on a conventional telephone answering machine or on a computer based voice mail system, the user must transcribe the voice mail message manually to obtain an accurate transcription of the voice mail message.

Another known technology, referred to as speech recognition, is the process by which an acoustic signal received by microphone is converted to a set of text words by a computer. These recognized words may then be used in a variety of computer software applications for purposes such as document preparation, data entry, and command and control. Recently, speech recognition has been applied to recording technology. Specifically, voice recorders have been designed to record audio input which subsequently can be supplied to a speech recognition engine for conversion to text. Still, in order to convert recorded audio to text, first the speech recognition engine must be trained to recognize the speaker supplying the originally recorded audio input.

Speaker Recognition is the process of automatically recognizing who is speaking on the basis of individual information included in speech signals. Speaker Recognition can be divided into Speaker Identification and Speaker Verification. Speaker Identification determines which registered speaker provides a given utterance from amongst a set of known speakers. By comparison, Speaker Verification accepts or rejects the identity claim of a speaker—is the speaker the person they say they are? Speaker Recognition technology has been applied to the problem of using a speaker's voice to control access to restricted services, for example, phone access to banking, database services, shopping or voice mail, and access to secure equipment. Both technologies require users to "enroll" in the system, that is, to give examples of their speech to a system so that it can characterize (or learn) their voice patterns. Speaker Recognition methods can be divided into text-dependent and text-independent methods.

Paramount to text-independent speaker identification systems is the extraction of features from a given utterance which uniquely belong to a speaker and do not change with time. Specifically, when collecting enrollment data in a speech recognition system, the features of a speaker's speech can be extracted and associated with a known speaker and stored in a database along with a reference, for example a name or identifier associated with the known speaker. Typically, during feature extraction, a speaker-independent phoneme detector can recognize a phoneme that is distinctive from speaker to speaker. The enrollment data subsequently can be retrieved using the reference and compared with features extracted from an unknown speaker voice. If the features extracted from the unknown speaker voice favorably compare with the features of the retrieved enrollment data, the unknown speaker can be identified as the speaker who had provided the retrieved enrollment data.

Notwithstanding advances in Speaker Recognition technology, voice mail systems have yet to incorporate Speaker Recognition technology beyond access control. Moreover, although both computer based voice mail systems and speech recognition systems employing Speaker recognition technology exist, there has yet to be a union of the two technologies to better serve the user. Accurate and efficient transcription of voice mail messages based on Speaker Recognition technology would greatly enhance the usefulness of a computer based voice mail system. As a result, there has arisen a need for a system of transcribing computer voice mail messages.

SUMMARY OF THE INVENTION

The invention disclosed herein for transcribing computer voice mail messages in accordance with the inventive arrangements satisfies the long-felt need of the prior art by using a speech recognition system equipped with Speaker Recognition technology in conjunction with a computer based voice mail system. The invention can receive or import a voice mail message stored in an audio file from a computer voice mail system. After importation of the voice mail message, the system can identify the speaker of the voice mail message. Using enrollment data corresponding to the identified speaker, the system can convert the voice mail message to text, or transcribe, the audio contained in the audio file. Finally, the text can be stored in a text file. Thus, the resulting text file is much smaller in size than the imported audio file from which the text was converted. The decreased file size is especially beneficial for saving storage space and reducing the resources needed to transmit the file. Moreover, the resulting text file can be made available to the user in a variety of forms including, but not limited to displaying the text on a video display terminal, printing the text, transmitting the text file, or storing the text file for use at a later time.

The invention concerns a method and a system for transcribing a voice mail message. The method of the invention involves a plurality of steps including, first providing a computer voice mail message stored in an audio file to a computer speech recognition system and, second, submitting the computer voice mail message to a speaker identification process in the speech recognition system. Notably, the speaker identification process can identify an enrolled speaker as a source of the computer voice mail message. Finally, responsive to the identification of the enrolled speaker, the computer voice mail message can be submitted to a speech conversion process in the speech recognition system. The speech conversion process can perform speech-to-text conversion of the computer voice mail message using speaker enrollment data corresponding to the identified enrolled speaker. Furthermore, the speech-to-text conversion can produce a transcription of the computer voice mail message. In one embodiment of the present invention, the transcription further can be displayed.

The speaker identification process can identify an enrolled speaker having speaker enrollment data as a source of the voice mail message using text-independent speaker identification. Alternatively, the speaker identification process can provide to a user a list of enrolled speakers, each enrolled speaker having corresponding enrollment data. The speaker identification process can accept a selection by the user of one of the enrolled speakers in the list; and, subsequently, can identify the selected enrolled speaker as a source of the voice mail message.

The speaker identification process can create a speaker enrollment if the speaker identification process fails to identify an enrolled speaker as a source of the computer voice mail message. Furthermore, the created speaker enrollment can be associated with a non-enrolled speaker. Finally, when the created speaker enrollment has been associated with the non-enrolled speaker, the associated speaker can be identified as a source of the voice mail message. Significantly, the step of creating an enrollment can include performing an unsupervised enrollment of the associated speaker.

Notably, the invention can be a system for transcribing a voice mail message. The system can include a voice mail system for recording a voice mail message spoken by a caller; a speaker identification processor for identifying a source speaker associated with the recorded voice mail message; and, a speech recognition system for performing speech-to-text conversion of the recorded voice mail message using speaker enrollment data corresponding to the identified source speaker associated with the recorded voice mail message. Significantly, the speech-to-text conversion can produce a transcription of the voice mail message. Moreover, the system can further include display means for displaying the transcription. Additionally, the display means can be either a printer for printing the transcription or a user interface for visually displaying said transcription.

Significantly, the speaker identification processor can perform text-independent speaker identification. In addition, the system can further include an unsupervised enrollment processor for creating speaker enrollment data associated with a source of the voice mail message not identified by the speaker identification processor. The speech recognition system can perform speech-to-text conversion of a voice mail message spoken by the unknown speaker using the created speaker enrollment data.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, Is which comprises all the features enabling the implementation of the methods described herein, and which when loaded in a computer system is able to carry out these methods. Computer program means or computer program in the present context mean any expression, in any language, code or notation, of a set of instructions intended to cause a system having an information processing capability to perform a particular function either directly or after either or both of the following: a) conversion to another language, code or notation; b) reproduction in a different material form.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

Figure 1:
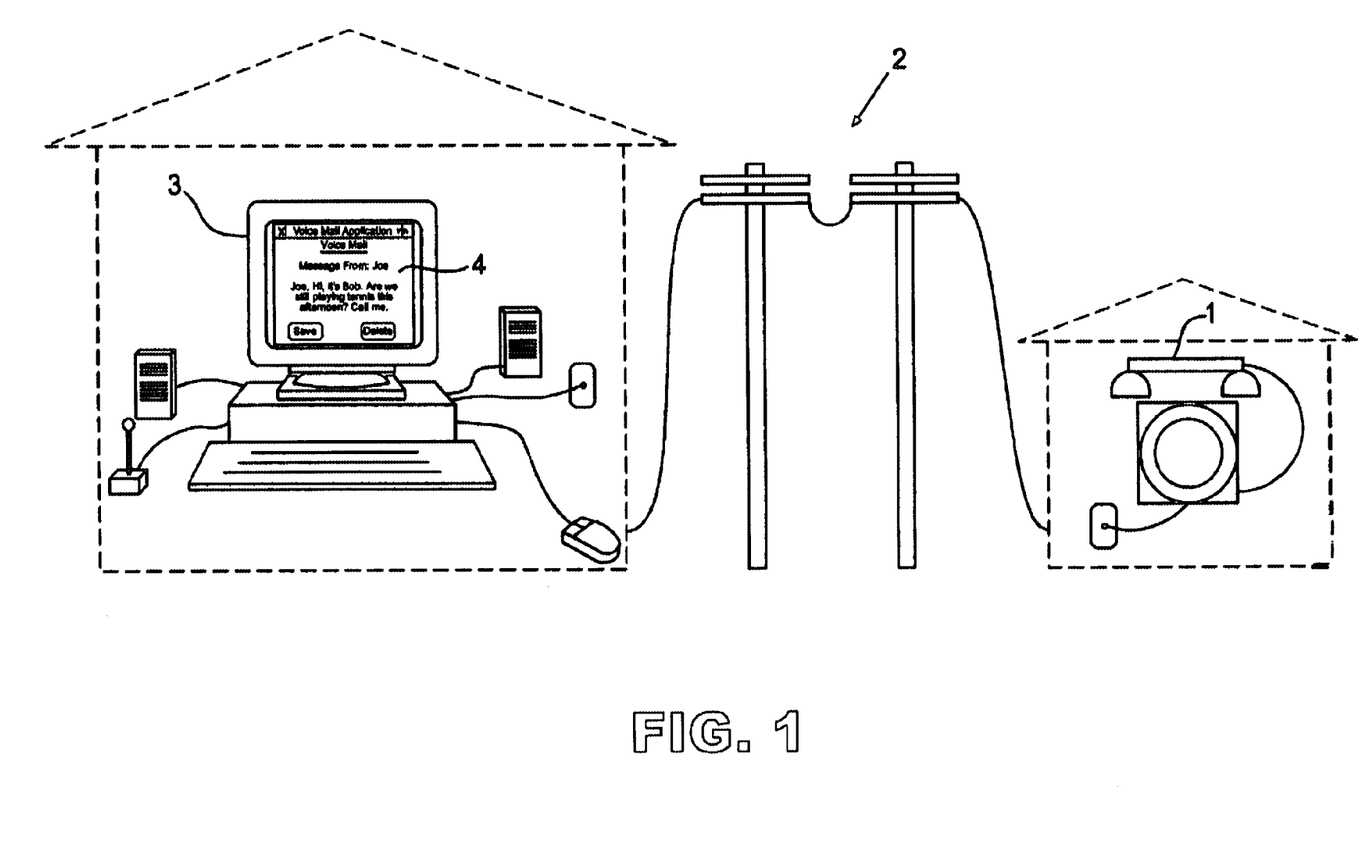
FIG. 1 is a schematic illustration depicting the operation of a computer system configured to receive voice mail in substitute for a traditional telephone answering machine.

FIG. 1 depicts a typical arrangement of a personal computer configured to process voice mail in accordance with the inventive arrangements in lieu of a traditional telephone answering machine. Specifically, as shown in the figure, a caller can initiate a phone call to a user of the present invention using telephone 1. Notably, the use can have in lieu of a telephone answering machine, a computer system 3 which can include therein a voice mail processing system 4 in accordance with the inventive arrangements. Subsequently, if the user does not "answer" the caller's phone call, the voice mail processing system 4 can perform conventional voice mail message recording as well as transcribing the voice mail message in accordance with the method of the invention. Each of the computer system 3 and the telephone 1 can be communicatively connected across communications medium 2. While FIG. 1 depicts the communications medium 2 as a telephone cabling system, the invention is not limited in this regard. Rather, the communications medium 2 can be any suitable medium for telephonically connecting two nodes, for example a cellular or satellite communications system.

The voice mail processing system 4 for transcribing text from a recorded voice mail enables a user to automatically obtain a textual transcription of a computer voice mail message stored as a digital audio file within a computer system. In the preferred embodiment, responsive to receiving such a digital audio file, the voice mail processing system 4 automatically can identify a particular caller as the source of the computer voice mail message by matching that caller to a unique user enrollment and corresponding enrollment identification. Unique user enrollments which correspond to callers increase transcription accuracy and can be created using text-independent speaker identification and unsupervised enrollment. Once a caller is identified, the voice mail processing system 4 can produce a transcription of the voice mail message using the unique user enrollment corresponding to the identified caller. Alternatively, the user can manually choose a particular user enrollment to use when transcribing the voice mail message. Still, by using independent speaker identification, the voice mail processing system 4 can produce a transcription of the voice mail message without a unique user enrollment corresponding to the caller. Finally, a transcription of the voice mail message can be provided to the user.

Figure 2:
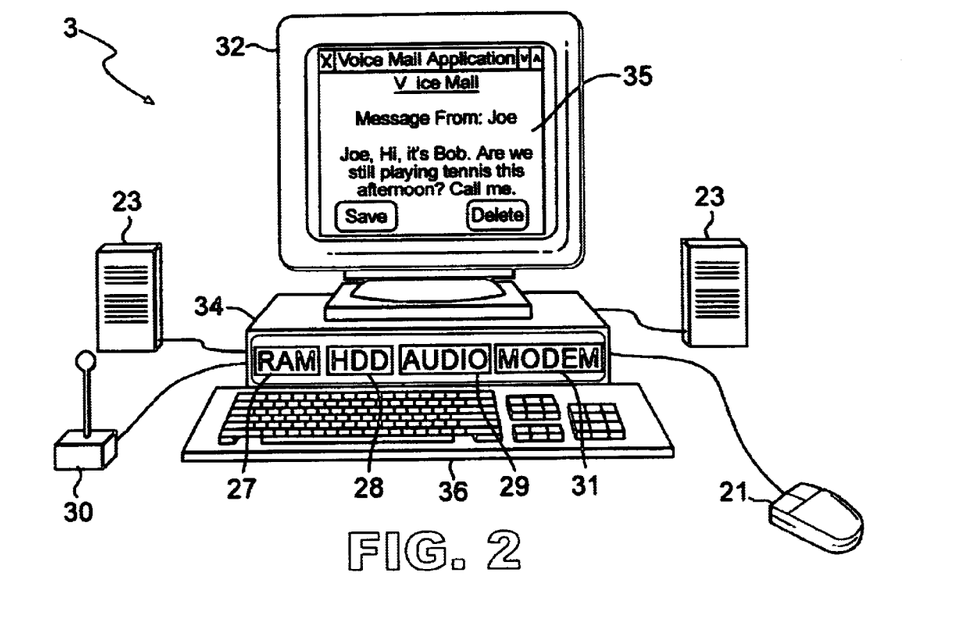
FIG. 2 is a block diagram which illustrates a computer system configured to receive voice mail in accordance with the method of the invention.

FIG. 2 illustrates in further detail a computer system 3 for use in conjunction with the present invention. The system is preferably comprised of a computer 34 including a central processing unit (CPU), one or more memory devices and associated circuitry. The computer system 3 includes a computer memory device 27, which is preferably comprised of an electronic random access memory. Additionally, the computer system 3 can include and a bulk data storage medium 28, such as a magnetic hard disk drive. The computer system 3 can further include at least one user interface display unit 32 such as a video data terminal (VDT) operatively connected thereto, as well as an interface device, such as mouse 21. The CPU can be comprised of any suitable microprocessor or other electronic processing unit, as is well known to those skilled in the art. An example of such a CPU would include the Pentium or Pentium II brand microprocessor available from Intel Corporation or any similar microprocessor.

In accordance with the method of the invention, the computer system 3 can perform speech recognition functions. As such, the computer system 3 can also include audio circuitry 29 for processing audio input in the form of real time audio signals received through a microphone 30, or audio signals stored in the fixed storage 28, for example a Wave or MP3 file. The audio circuitry 29 can also process audio output and provide the audio output to speakers 23. In the preferred embodiment, the audio circuitry 29 can be a commercially available sound card designed for use in a multimedia personal computer system.

Finally, the computer system 3 can include suitable communications hardware and software for communicatively connecting the computer to other communications devices. Specifically, in the preferred embodiment, the computer system 3 can include a modem 31 for placing and receiving telephone calls. The modem 31 can be any commercially available modem, although in the preferred embodiment, the modem 31 is a Hayes-compatible 56K internal modem for use with a multimedia computer system. Still, the invention is not limited in regard to the communications hardware and software. Rather, paramount to the present invention is the requirement that the computer system 3 merely receive and record voice mail messages. Thus, in other embodiments, a modem can be substituted with any suitable communications device, for example a wireless receiver wherein the voice mail messages are received wirelessly in the computer system 3, or a network card wherein the voice mail messages can be received in a network and transmitted to the computer system 3 through a local area network. Notably, the various hardware requirements for the computer system as described herein can generally be satisfied by any one of many commercially available high speed multimedia personal computers such as those offered and manufactured by International Business Machines Corporation.

Figure 3:
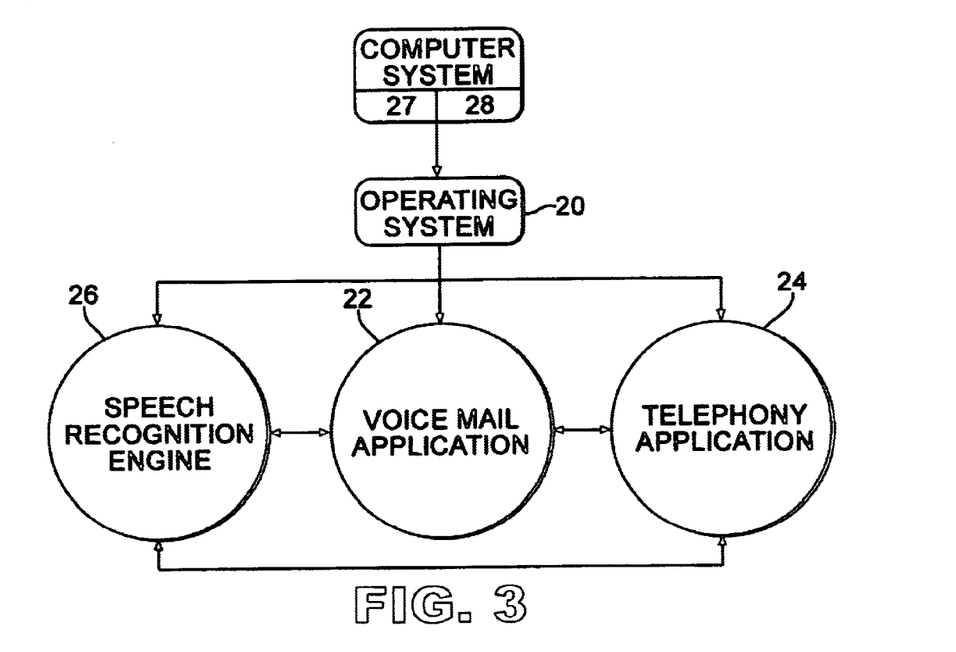
FIG. 3 is a block diagram showing a typical high level architecture for the computer system in FIG. 2.

FIG. 3 illustrates a typical architecture for a system for converting voice mail to text in computer 3. As shown in FIG. 3, the system typically includes an operating system 20 and a conventional speech recognition engine 26. In the example shown, a voice mail application 22 and a communications client 24 are also provided. In FIG. 3, the speech recognition engine 26, voice mail application 22 and a communications client 24 are shown as separate application programs. It should be noted however that the invention is not limited in this regard, and these various application programs could be implemented as a single, more complex applications program. For example the speech recognition engine 26 could be combined with the voice mail application 22.

In a preferred embodiment which shall be discussed herein, operating system 20 is one of the Windows family of operating systems, such as Windows NT, Windows 2000 or Windows 98 which are available from Microsoft Corporation of Redmond, Wash. However, the system is not limited in this regard, and the invention can also be used with any other type of computer operating system.

As shown in FIG. 3, computer system 3 includes random access memory 27 and fixed storage 28. The fixed storage 28 can store therein each of the operating system 20, voice mail application 22, and communications client 24. Upon bootstrap of the computer system 3, the operating system 20 can be loaded into random access memory 27. Similarly, upon execution, each of the voice mail application 22 and the communications client 24 can be loaded into random access memory 27 for execution by the client computer 3. Significantly, the voice mail application 22 can be programmed to perform the method of the invention. Notably, the voice mail application 22 as disclosed herein can be implemented by a programmer, using commercially available development tools for the operating systems described above.

In operation, a voice mail message containing audio signals representative of the speech of a caller can be recorded and stored digitally in a file in either random access memory 27 or fixed storage 28 (or both) within the computer system 3. The voice mail message, existing in the form of a digital audio file, can be in any of a variety of standard multimedia or audio file formats such as Wave or MP3. It should be appreciated that the invention is not so limited by the specific file format in which the voice mail messages are stored. Notably, the particular file format is dependent upon the computer voice mail application 22 chosen by the user. With the aid of the operating system 20, audio signals contained in the voice mail message can be made available to a speaker identification process in the speech recognition engine 26. In this manner, the speaker identification process can identify the speaker of the words spoken by the caller and contained as digital audio within the voice mail message. Subsequently, enrollment data corresponding to the identified speaker can be used in a speech-to-text conversion process in the speech recognition engine 26, with which the speech-to-text conversion process can perform speech-to-text conversion of the audio signals. As such, the audio signals contained in the voice mail message can be accurately and efficiently converted to a transcription of the voice mail message.

Figure 4:
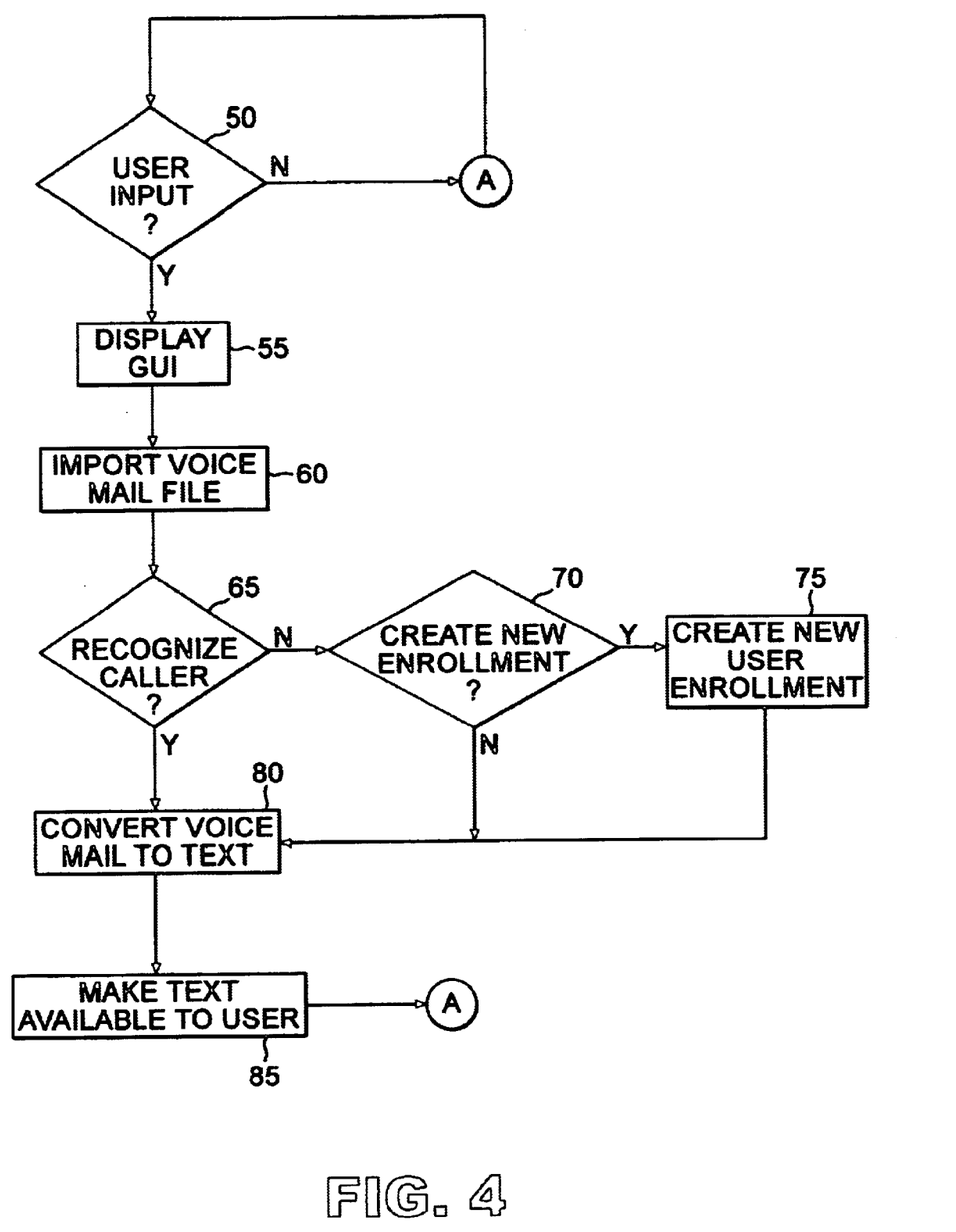
FIG. 4 is a flow chart for illustrating a method of transcribing text from a computer voice mail message.

FIG. 4 is a flow chart for illustrating a method and system for transcribing text from a computer voice mail message using a conventional speech recognition system. In the preferred embodiment, an audio file containing a voice mail message is made available to the speech recognition system. Notably, the audio file can be made available to the speech recognition system using a commercially available application programming interface (API) to the speech recognition system. Those skilled in the art will recognize that a conventionally available speech recognition system can include an API having included therewith a preprogrammed method for supplying an audio file to the speech recognition system for processing the same. Typically, such preprogrammed methods can receive as input a reference to the audio file. Notably, in addition a typical API to a conventional speech recognition system can also include preprogrammed methods for modifying configuration parameters within the speech recognition system, for example current enrollment data and a target output file for storing the results of a speech recognition operation performed on an audio file.

If the user has created speaker enrollment data corresponding to the speech of the caller, the speech recognition system preferably can use text-independent Speaker Identification for automatically determining the identity of the caller. Once identified, the speech recognition system can transcribe the computer voice mail message to text using the speaker enrollment data corresponding the identified caller. Alternatively, the speech recognition, in coordination with the voice mail system, can allow the user to select stored speaker enrollment data for transcribing the computer voice mail message. If no speaker enrollment data exists which corresponds to the caller, then the speech recognition system can transcribe the computer voice mail message using speaker independent identification, emphasizing speaker independent speech characteristics. In this case the user can create enrollment data for the caller for use with future transcriptions. Once the speech recognition system produces a transcription of the computer voice mail message, the speech recognition system can provide the transcription to the user by any one of a variety ways including, but not limited to, printing a hard copy of the transcription, storing the transcription in memory, displaying the transcription in the voice mail system, or transmitting the transcription to another location.

The method illustrated in FIG. 4 begins with the speech recognition system in an active state, engaged in a continuous loop awaiting a user input. Additionally, the user's computer system 3, being used as a voice mail system, contains voice mail messages in the form of digital audio files from various callers. It should be appreciated that although the system for transcribing voice mail messages is described as a standalone application program, the system can be activated from within a separate application program, such as an electronic mail program, by providing a button, menu item, or speech command for enabling transcription of voice mail messages within the other application program.

In any case, starting with step 50, the system for transcribing voice mail messages waits for a user input requesting transcription of a voice mail message, also referred to as conversion of the voice mail message to text. The user input requesting transcription of a voice mail message can be any of a variety of suitable forms including, but not limited to, a user voice command, a keyboard entry, or a mouse manipulation. Thus, if the system receives an input indicating that the user would like to transcribe a voice mail message, the system proceeds to step 55. If not, then the system continues to loop until such an input is received.

In step 55, the system for transcribing voice mail messages requests that the user identify a particular voice mail message to the system for transcription. For example, the system can present the user with a graphical user interface (GUI) having standard file navigation controls enabling the user to navigate to the location in computer memory containing the voice mail message to be transcribed. Within the GUI, the user may identify the voice mail message to the system by highlighting the voice mail message using a mouse, a keyboard entry, or a spoken utterance. It should be appreciated by those skilled in the art that the invention is not limited to receiving a single voice mail message for transcription. For example, the GUI can allow the user to identify or highlight multiple voice mail messages to the system for transcription. Alternatively, the user can specify attributes of voice mail messages for transcription. In illustration, instead of selecting a single voice mail message or multiple messages in a serial manner, the user may identify all voice mail messages originating on a particular day, or from a particular caller. Regardless of the particular format of the GUI used by the system, if one or more voice mail messages are identified, the system proceeds to step 60.

In step 60, the voice mail message selected by the user is imported or made available to the speech recognition system for transcription. The system for transcribing voice mail messages can playback the voice mail message into a dictation client contained in the speech recognition system 22. In this manner, the file format of the voice mail message can be converted into a format more suitable for use by the speech recognition engine for producing a transcription of the voice mail message. Alternatively, the voice mail message can be provided to the speech recognition system 22 through an API call passing thereto a reference to the voice mail message file.

In step 65, for callers having unique user enrollments, the system can determine the identity of a caller from the voice mail message provided by the caller. More specifically, the system for transcribing voice mail messages can analyze the first several seconds of the voice mail message. The caller's identity can be determined by matching the speech recorded in the voice mail message to the caller's unique speaker enrollment data and corresponding speaker identification. The system for transcribing voice mail messages can use text-independent speaker identification, a technology well known in the art and commercially available from speech recognition system manufacturers such as International Business Machines Corporation, for analyzing the voice mail message.

For example, if a user receives voice mail messages from a caller "Joe", then the user can create enrollment data for "Joe". Once unique enrollment data and a corresponding unique speaker identification have been created for "Joe", the system for transcribing voice mail messages can determine whether "Joe" is the source of subsequently received voice mail messages. Thus, the system can automatically recall the proper unique speaker enrollment data and speaker identification corresponding to the caller named "Joe".

Once recalled from memory, the unique speaker enrollment data corresponding to the identified caller can be used to aid in the transcription of the voice mail message. If the system can determine the identity of the caller from the computer voice mail message by matching the caller to a corresponding unique user enrollment, then the system proceeds to step 80. If not, then the system proceeds to step 70.

In step 70, the system for transcribing voice mail messages notifies the user that the system was either unable to identify the caller within the voice mail message, or alternatively, that no user enrollment corresponds to the caller. Regardless, the system for transcribing voice mail messages further can ask the user if the user would like to create a new and unique user enrollment corresponding to the unidentified caller. If so, then the system proceeds to step 75. If not, then the system proceeds directly to step 80.

In step 75, the system guides the user through the process of creating new and unique speaker enrollment data corresponding to the unidentified caller. For example, the system for transcribing voice mail messages can use a wizard format for guiding the user through the enrollment process step by step. It should be appreciated that the user can create unique speaker enrollment data for each caller leaving a voice mail message on the user's computer.

Speaker enrollments corresponding to individual callers result in increased transcription accuracy of voice mail messages. Specifically, the user can provide the system for transcribing voice mail messages with a transcription of a previous voice mail message along with a transcription of the corresponding voice mail message itself. By comparing the transcription to the corresponding caller's speech contained in the voice mail message, the system can build a speaker enrollment, comprising speaker dependent characteristics, unique to the particular caller. Further, the user can provide the system with multiple voice mail messages and corresponding transcriptions from the caller to achieve greater accuracy. Notably, as the user supplies more voice mail messages with corresponding transcriptions to the system, over time, any errors within the transcriptions are outweighed by the correct portions of the transcription as the system builds the user enrollment. The newly created user enrollment can be assigned a user identification also unique to the particular caller. This technique is typically referred to as a "supervised adaptation" or "supervised enrollment".

Taking the previous example, if a user frequently gets voice mail messages from a person named "Joe", the user can choose an option within the system to create an enrollment. The system requests that the user identify a voice mail message and corresponding transcription from the caller for whom the user wishes to create a unique speaker enrollment. After comparison of the transcriptions and voice mail messages, the system can create a speaker enrollment unique to "Joe" having a user identifier, for example "Joe". In this manner, each caller can have a corresponding unique user identification and enrollment.

In a preferred embodiment, the system for transcribing voice mail messages advantageously can employ "unsupervised adaptation" techniques, also known as "unsupervised enrollment". Unsupervised adaptation is a technology known in the art and commercially available from speech recognition system manufacturers. Unsupervised adaptation can be used to create user enrollments without the benefit of pre-existing transcriptions from a known source. In the present invention, when a transcription of speech is not available to perform a traditional, supervised enrollment, the system for transcribing voice mail messages can use the speech recognition system to generate a hypothesis from a voice sample from an unknown speaker, which is assumed to be the correct transcription in the adaptation process. After completion of the speaker enrollment process, the system proceeds to step 80.

In step 80, the system for transcribing voice mail messages performs speech recognition on the voice mail message to convert the contents of the message to text. Notably, if the system had previously determined the identity of the caller and the corresponding unique user enrollment and user identification, then the system can use that enrollment to aid in the transcription of the voice mail message, leading to improved transcription accuracy. Such a process includes using both speaker dependent and speaker independent characteristics to convert speech within the voice mail message to text. If however, no speaker enrollment corresponds to the caller, or the user did not wish to create a user enrollment for that caller, then the system can convert the contents of the voice mail message to text without the aid of a unique user enrollment corresponding to that particular user. In this case, the system can use speaker independent characteristics of a caller's speech within the voice mail message to perform speech recognition on the voice mail message. In either case, the system proceeds to step 85.

In step 85, the system for transcribing voice mail messages provides the user with the transcription of the voice mail message. The system can make the transcription available to the user in a number of different ways. For example, the computer can display the textual transcription on the user's VDT, print the transcription, or save the transcription as a file in computer memory, for example as a text file or other user specified word processor file format.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method of transcribing a computer voice mail comprising:

providing a computer voice mail message stored in an audio file to a computer speech recognition system;

submitting said computer voice mail message to a speaker identification process in said speech recognition system, said speaker identification process identifying an enrolled speaker as a source of said computer voice mail message; and, responsive to said identification of said enrolled speaker, submitting said computer voice mail message to a speech conversion process in said speech recognition system, said speech conversion process performing speaker-dependent speech-to-text conversion of said computer voice mail message using speaker enrollment data corresponding to said identified enrolled speaker;

said speech-to-text conversion producing a transcription of said computer voice mail message.

2. The method of claim 1, further comprising the steps of:
displaying said transcription.

3. The method of claim 1, wherein said speaker identification process comprises the steps of:
identifying an enrolled speaker having speaker enrollment data as a source of said voice mail message using text-independent speaker identification.

4. The method of claim 1, wherein said speaker identification process further comprises the steps of:
if said speaker identification process fails to identify an enrolled speaker as a source of said computer voice mail message, creating a speaker enrollment;
associating said created speaker enrollment with a non-enrolled speaker; and,
identifying said associated speaker as a source of said voice mail message.

5. The method of claim 4, wherein said step of creating an enrollment comprises the step of:
performing an unsupervised enrollment of said associated speaker.

6. The method of claim 1, wherein said speaker identification process comprises the steps of:
providing to a user a list of enrolled speakers, each enrolled speaker having corresponding enrollment data;
accepting a selection by said user of one of said enrolled speakers in said list; and,
identifying said selected enrolled speaker as a source of said voice mail message.

7. A system of transcribing a voice mail message comprising:
a voice mail system for recording a voice mail message spoken by a caller;
a speaker identification processor for identifying a source speaker associated with said recorded voice mail message; and,
a speech recognition system for performing speaker-dependent speech-to-text conversion of said recorded voice mail message using speaker enrollment data corresponding to said identified source speaker associated with said recorded voice mail message, said speech-to-text conversion producing a transcription of said voice mail message.

8. The system of claim 7, further comprising:
display means for displaying said transcription.

9. The system of claim 8, wherein said display means is selected from the group of a printer for printing said transcription and a user interface for visually displaying said transcription.

10. The system of claim 7, wherein said speaker identification processor implements a text-independent speaker identification technique.

11. The system of claim 7, further comprising:
an unsupervised enrollment processor for creating speaker enrollment data associated with a source of said voice mail message not identified by said speaker identification processor;
said speech recognition system performing said speech-to-text conversion of a voice mail message spoken by said unknown speaker using said created speaker enrollment data.

12. A machine readable storage, having stored thereon a computer program for transcribing a voice mail message, said computer program having a plurality of code sections executable by a machine for causing the machine to perform the steps of:
providing a computer voice mail message stored in an audio file to a computer speech recognition system;
submitting said computer voice mail message to a speaker identification process in said speech recognition system, said speaker identification process identifying an enrolled speaker as a source of said computer voice mail message; and,
responsive to said identification of said enrolled speaker, submitting said computer voice mail message to a speech conversion process in said speech recognition system, said speech conversion process performing speaker-dependent speech-to-text conversion of said computer voice mail message using speaker enrollment data corresponding to said identified enrolled speaker;
said speech-to-text conversion producing a transcription of said computer voice mail message.

13. The machine readable storage of claim 12, said computer program further comprising a plurality of code sections executable by a machine for further causing the machine to perform the step of:
displaying said transcription.

14. The machine readable storage of claim 12, wherein said speaker identification process comprises the step of:
identifying an enrolled speaker having speaker enrollment data as a source of said voice mail message using text-independent speaker identification.

15. The machine readable storage of claim 12, wherein said speaker identification process further comprises the steps of:
if said speaker identification process fails to identify an enrolled speaker as a source of said computer voice mail message, creating a speaker enrollment;
associating said created speaker enrollment with a non-enrolled speaker; and,
identifying said associated speaker as a source of said voice mail message.

16. The machine readable storage of claim 15, wherein said step of creating an enrollment comprises the step of:
performing an unsupervised enrollment of said associated speaker.

17. The machine readable storage of claim 12, wherein said speaker identification process comprises the steps of:
providing to a user a list of enrolled speakers, each enrolled speaker having corresponding enrollment data;
accepting a selection by said user of one of said enrolled speakers in said list; and,
identifying said selected enrolled speaker as a source of said voice mail message.

18. A method of transcribing a computer voice mail comprising:
providing a computer voice mail message stored in an audio file to a computer speech recognition system;
utilizing prosodic information within said computer voice mail message to automatically identify an enrolled speaker as a source of said computer voice mail message; and,
responsive to said identification of said enrolled speaker, submitting said computer voice mail message to a speech conversion process in said speech recognition system, said speech conversion process performing speech-to-text conversion of said computer voice mail message using speaker enrollment data corresponding to said identified enrolled speaker;

said speech-to-text conversion producing a transcription of said computer voice mail message.

19. The method of claim 18, said speech conversion process further comprising the step of performing speaker-dependent speech conversion to produce said transcription.

20. A machine readable storage, having stored thereon a computer program for transcribing a voice mail message, said computer program having a plurality of code sections executable by a machine for causing the machine to perform the steps of: providing a computer voice mail message stored in an audio file to a computer speech recognition system;

utilizing prosodic information within said computer voice mail message to automatically identify an enrolled speaker as a source of said computer voice mail message; and, responsive to said identification of said enrolled speaker, submitting said computer voice mail message to a speech conversion process in said speech recognition system, said speech conversion process performing speech-to-text conversion of said computer voice mail message using speaker enrollment data corresponding to said identified enrolled speaker;

said speech-to-text conversion producing a transcription of said computer voice mail message.

21. The machine readable storage of claim 20, said speech conversion process further comprising the step of performing speaker-dependent speech conversion to produce said transcription.

* * * * *